July 3, 1956 M. J. MRAZ 2,752,824
RETRACTABLE MOUNT FOR ROCKETS
Filed Jan. 8, 1951 2 Sheets-Sheet 1

*INVENTOR.*
MILES J. MRAZ
BY
William R. Lane
ATTORNEY

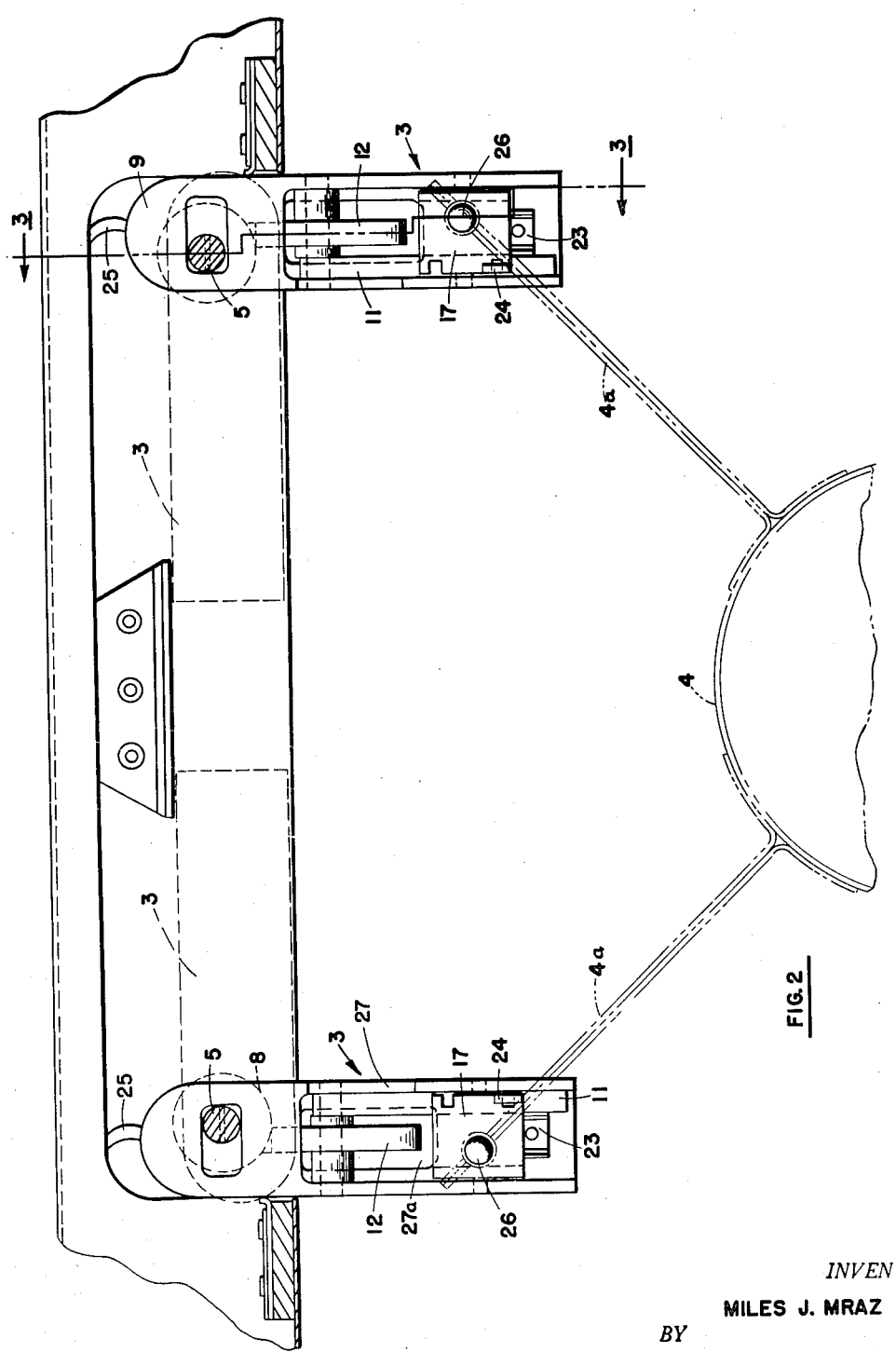

ated July 3, 1956

United States Patent Office 2,752,824

2,752,824
RETRACTABLE MOUNT FOR ROCKETS

Miles J. Mraz, Cicero, Ill., assignor to North American Aviation, Inc.

Application January 8, 1951, Serial No. 204,930

3 Claims. (Cl. 89—1.7)

This invention pertains to a mounting arrangement for rockets. It more particularly pertains to a mounting arrangement for rockets on airplanes.

It is an object of this invention to provide a support for a rocket which efficiently holds the rocket on the airplane.

A further object of this invention is to provide a mounting which enables the rocket to be readily self-launching.

It is yet another object of this invention to provide a mount which automatically retracts into a position flush with the airplane construction when the rocket has been launched.

It is yet another object of this invention to provide a rocket mounting means which can be locked in extended position preparatory to attaching the rocket thereto and which becomes armed for automatic return when the rocket is properly mounted on the mount.

It is still another object of this invention to provide an arrangement whereby the rockets may be jettisoned with facility when so desired by the pilot.

Other objects of invention will become apparent from the following description taken in connection with the accompanying drawings, in which Fig. 1 is an elevational view showing the rocket mounted on an airplane;

Fig. 2 is a front elevational view of the mount in extended and locked position with the rocket supported thereby shown in phantom;

Figure 3:
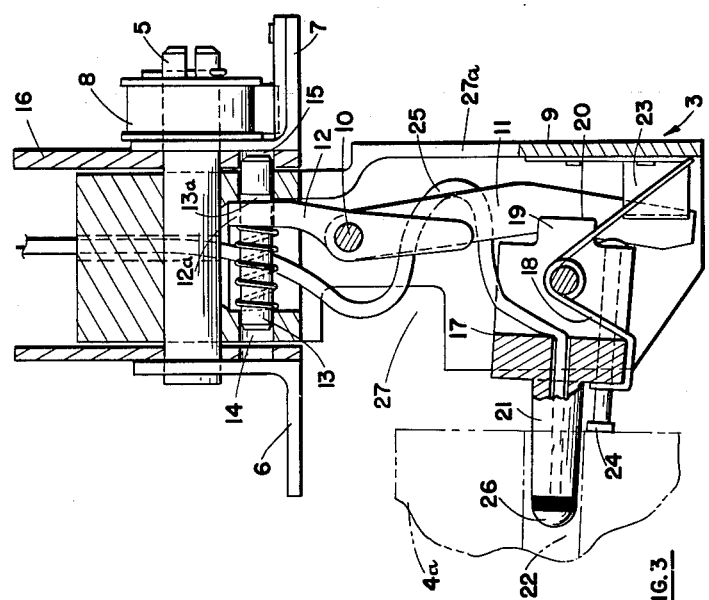
Fig. 3 is a side elevation of the mount taken at line 3—3 of Fig. 2.
Figure 4:
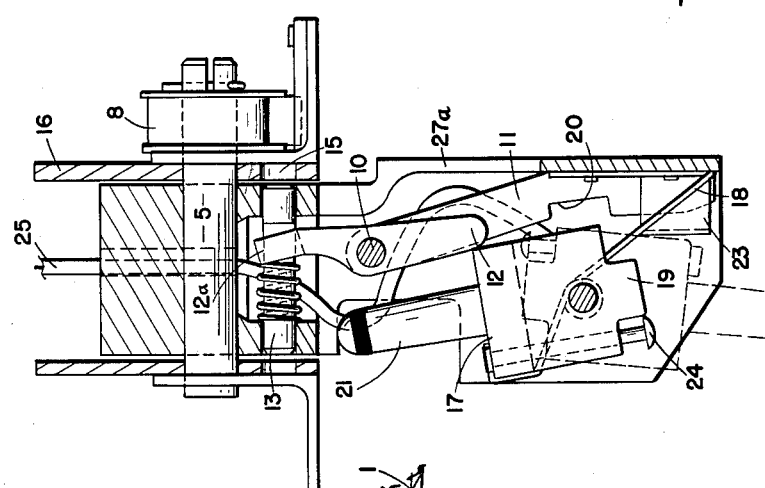
Fig. 4 is an elevational view similar to Fig. 3, immediately after the discharge of the rocket, showing the first step of the retracting action and, in dotted lines, the position of the rocket-supporting pin when the rocket is jettisoned.

Referring to the drawings, an airplane wing 1 is provided with front and rear mounts 2 and 3, respectively, for releasably carrying a rocket 4. In Fig. 2 there is shown a pair of rear mounts 3 which are identical in construction except that one is a right, and the other a lefthand mount. In this disclosure only one such rear mount will be described. Mount 3 includes a pin 5 which is suitably supported by structural members 6 and 7 adapted to be attached to the airplane structure. Pin 5 is urged in such a direction by coil spring 8 that member 3 is urged into a faired position within the stream line of the airplane as shown in dotted line position in Fig. 2. Mount 3 comprises, more specifically, a body member 9 to which is pivotally attached at 10 a latch member 11. Also pivotally mounted on pin 10 is a trigger member 12 having a forked portion 12a operatively engaging a spring-pressed plunger 13 slidable in bore 14 into recess 15 in structural frame member 16 for locking the body member in extended position. Plunger 13 has a flattened portion 13a for receiving the yoke portion 12a of trigger 12. Also pivotally mounted on the body member is a block member 17 which is constantly urged in a clockwise direction as shown in Fig. 3 into closed position by spring 18. Block 17 is provided with a lug 19 adapted to engage a corresponding recess 20 in latch 11 to hold the lug in the horizontal position as shown in Fig. 3 so that the rocket-supporting pin 21 can be received in the appropriate recess 22 in rocket fin 4a. A detent spring 23 is adapted to engage the side of latch 11 to hold it in either engaging position with lug 19 as shown in Fig. 3, or in the retracted position, as shown in Fig. 4. Block 17 is also provided with a trigger member 24 slidably received therein and adapted to engage latch 11. Operatively attached to rocket-supporting pin 21 is an electric igniter cable 25 for transmitting an electric charge from a suitable source of power (not shown) to the contact 26 for igniting the rocket.

In the operation of the rear mount, rocket-support 3 is manually rotated from the position shown in dotted lines in Fig. 2 to the full line position against the action of spring 8, with block member 17 out of contact with trigger member 12 so that plunger 13 will be received in recess 15 to hold the rear mount in extended position, thereupon block 17 is manually rotated to the position shown in Fig. 3 by grasping the pin 21 now exposed through cut-away area 27 in the side portion of body 9. The latch 11 is also moved manually by suitable means, such as a finger inserted through the opening 27a in body member 9, to engage the lug 19 in recess 20. Since trigger member 24 is slidably received in block 17 it will be moved into the forward position as shown in Fig. 3. On placing rocket member 4a upon support pin 21, trigger member 24 is moved rearwardly to cause latch 11 to be disengaged from lug 19. The rocket is then suspended from the front mount and the two supporting pins 21 in a manner which will be explained more fully in connection with the description of the front mount. The rear mount is now conditioned to be automatically returned to retracted position, as shown in dotted lines in Fig. 2. Discharge of rocket 4 will permit block 17 to be rotated by spring 18 into the position shown in Fig. 4. Block 17 will engage trigger 12 which in turn will retract plunger 13 from recess 15 and permit spring 8 to rotate the body member 9 into retracted position as shown in dotted lines in Fig. 2.

Figure 1:
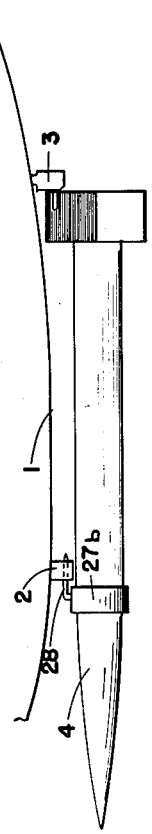
Figure 5:
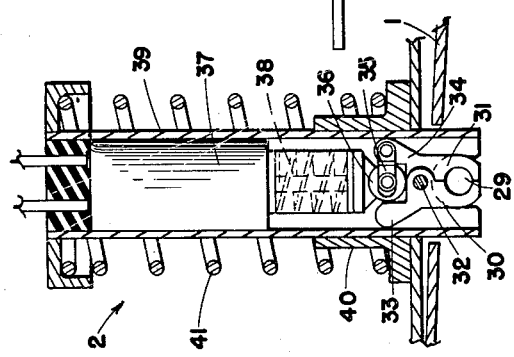
Fig. 5 is a sectional view of a front rocket mount. The specific details of the front rocket mount are more or less conventional.

Coming now to the front mount, as shown in Fig. 1, and more particularly in Fig. 5, rocket 4 is provided with a band 27b having integral therewith a rearwardly extending pin 28 adapted to be received in an opening 29 formed by lugs 30 and 31 pivoted for relative movement on pin 32. The lugs are provided with a pair of ears 33 and 34, to one of which is connected by means of a link 35 a roller 36 adapted to hold the lugs in closed position. Roller 36 is adapted to be actuated by a solenoid 37 to retract the same and permit lugs 30 and 31 to separate when it is desired to jettison the rocket. Spring 38 urges the roller 36 into extended position when released by the solenoid.

This entire arrangement is carried by a casing 39 slidably received in framing members 40 adapted to be attached to the aircraft structure 1. Spring 41 urges the assembly into retracted position upon release of the rocket.

In the operation of the front mount, the casing 39 is extended against the action of spring 41 to a position where pin 28 is placed in opening 29.

In the normal firing of the rocket, pin 28 slides forwardly out of opening 29. However, when it is desired to jettison the rockets, solenoid 37 is actuated to withdraw roller 36 out of engagement with ears 33 and 34, thereby permitting lugs 30 and 31 to separate and permit the rocket to pitch downwardly. Since latch 11 has been retracted by engagement of the fin 4a of the rocket with trigger 24, and the rocket being merely supported by pin 28 and the two pins 21 of rear rocket mounts 3, the block 17 is adapted to rotate counterclockwise to the position shown in dotted lines in Fig. 4 to permit ready and complete jettisoning of the rocket. Thereupon block 17 is returned to the retracted position shown in full lines in Fig. 4 to engage trigger member 12 which in turn retracts plunger 13 permitting the rear mount to be urged by spring 8 into faired position with respect to the airplane.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A retractable mount for rockets on aircraft comprising a body member rotatably mounted on said aircraft for movement from and to retracted position; spring means engaging said body member for urging said body member to retracted position; latch mechanism associated with said body member for holding said body member in extended position; block means pivotally mounted on said body member; a lug on said block; a second spring means biasing said block towards said latch mechanism; a latch bar carried by said body member, said lug engaging said latch bar to hold said block in rocket-engaging position; a trigger on said block operable by engagement with a rocket carried by said block to move said latch bar into disengaged position whereby upon firing of said rocket said second spring means causes said block to move into engagement with said latch mechanism to retract the same and permit said firstly mentioned spring means to move said body member into retracted position.

2. A retractable mount for rockets on an aircraft comprising a body member pivotally mounted on said aircraft for movement from and to a retracted position; means engaging said body member for urging said body member to a retracted position; a first latch means associated with said body member for holding said body member in an extended position; a rocket engaging member pivotally carried by said body member; a second latch means carried by said body member for holding said rocket engaging member in a rocket receiving position; means for urging said rocket engaging member to a retracted position; and means responsive to positioning of a rocket on said rocket engaging member for releasing said second latch means whereby upon release of said rocket said rocket engaging member subsequently engages to release said first latch means to return said body to a retracted position.

3. A retractable rocket mount for aircraft comprising a body member rotatably mounted on said aircraft for movement to and from an extended position; means engaging said body member for urging said member to a retracted position; a first latch means associated with said body member for holding said body member in said extended position; rotatable means adapted to engage and support a rocket, said rotatable means being secured to and carried by said body member and movable from a position within the confines of said body member to a position to receive said rocket; yieldable means for urging said rotatable means to said position within said body; a second latch means for maintaining said rotatable means in said rocket receiving position in opposition to said yieldable means; and means responsive to engagement by said rocket when received on said rotatable means for disengaging said second latch means whereby upon release of said rocket from said mount said rotatable means is retracted within said body member thereby engaging to release said first latch means to return said body to said retracted position.

References Cited in the file of this patent

UNITED STATES PATENTS

| | | |
|---|---|---|
| 1,382,375 | Menchen | June 21, 1921 |
| 2,422,660 | Elder et al. | June 24, 1947 |
| 2,481,542 | Schuyler | Sept. 13, 1949 |
| 2,544,830 | Grell et al. | Mar. 13, 1951 |
| 2,591,834 | Kuka | Apr. 8, 1952 |